C. REVAILLOT.
PIPE JOINT.
APPLICATION FILED MAR. 6, 1909.

974,517.

Patented Nov. 1, 1910.

UNITED STATES PATENT OFFICE.

CLAUDE REVAILLOT, OF NICE, FRANCE.

PIPE-JOINT.

974,517.  Specification of Letters Patent.  Patented Nov. 1, 1910.

Application filed March 6, 1909. Serial No. 481,683.

*To all whom it may concern:*

Be it known that I, CLAUDE REVAILLOT, a citizen of the Republic of France, and residing at Nice, in France, have invented certain new and useful Improvements in Pipe-Joints, of which the following is a specification.

This invention has for its object novel means for the rapid joining of tubes, made of caoutchouc, linen and the like.

This joint is composed of two identical parts. Each part consists of a little spiral ring, a ring of caoutchouc and an independent collar. The whole is shown in the accompanying drawing and described in the following specification.

Figure 1:
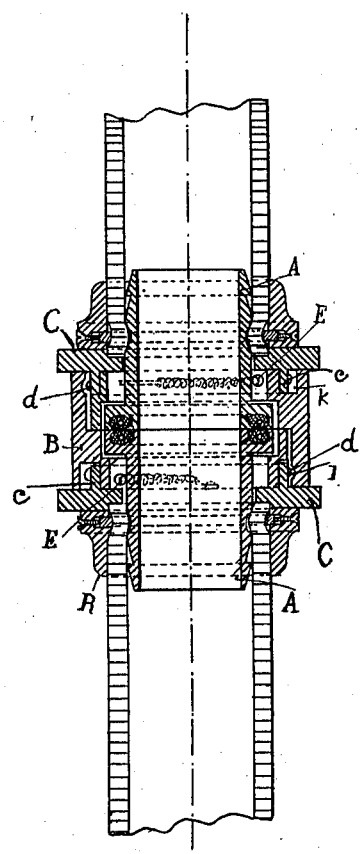
Figure 2:
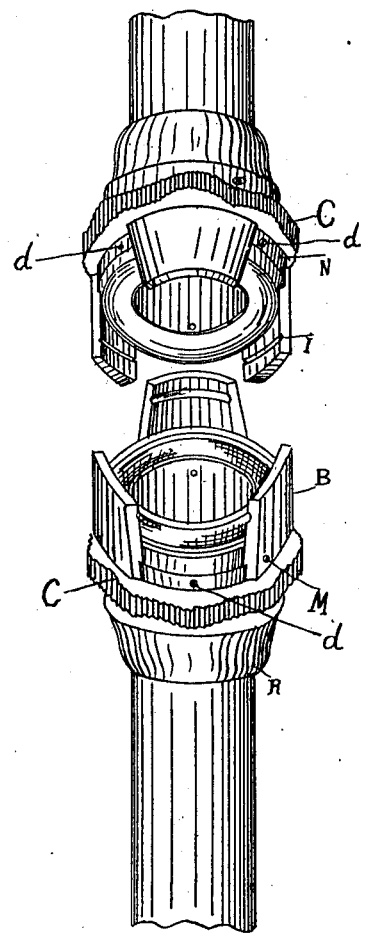

Figure 1 shows a longitudinal section through the axle of the two pieces assembled. Fig. 2 shows a perspective view of the two parts of the joint, separated.

The cylindrical junction-piece B consists of three trapezoidal wings leaving between them spaces of the same form, but inverted; this form facilitates the assemblage. Each end of these three wings bears a circular groove I, the utility of which will be explained hereafter, as will also the circular groove K at the bases of the wings.

The piece C has the form of a channeled and milled crown to facilitate the holding in the hand; it bears another crown in relief c which is lodged in the groove K above mentioned. Upon this crown in relief are disposed three studs d, one corresponding to each wing; these studs are to be lodged in the grooves I.

The groove K is intended to be occupied by these studs at the time of assemblage. The crown in relief is maintained in the groove by means of three sunken screws M. The said screws are so placed that they do not interfere with the displacement of the stud d, when it is engaged under the wing; moreover they pass through the crown in relief with the aid of an opening e, which permits only a limited rotary movement of the crown C on the piece B.

The spring E is placed between the central piece A and the junction-piece B, in a cavity, as shown. The spring becomes semi-circular when the piece A is in place and has for its object to maintain the coupling in a steady condition. To avoid any disjoining in service, the grooves I are slightly helicoidal so as to produce a more efficient pressure upon the rings f of caoutchouc.

When the coupling is assembled, the two rings of caoutchouc under the strength of the pressure, lose their form, at least in the part not fitted in the grooves they have the form of an oval; when they are receiving the inner pressure, they are swelled out; at this time the contact is perfect, which makes a joint of an absolute tight character.

The central piece A is cylindrical, at one end a circular groove, having the form of a semi-circle, will receive the ring of caoutchouc. The collar R, in only one part, will bear an inner circular groove, in which may slide a ring of metal in three parts and of a smaller diameter than that of the tube.

The fastening will be produced by means of screws with countersunk heads shown in Fig. 1.

To assemble the elements, when they are disassembled, the operator takes one part C in each hand, introduces the wings in their respective lodgment, and gives a slight rotary motion to the pieces C, so as to engage the studs in the corresponding grooves. The spiral spring facilitates the operation, and it maintains the fastening: the separation is thus impossible during use.

The advantages of this joint are the following: It is a simple rapidly manipulated assemblage, necessitates neither tools nor special key; it is absolutely tight. This joint presents no projection, exposed to be deteriorated and thus interfere with good working.

What I claim is:—

1. In a device of the character described, a cylindrical junction piece having trapezoidal wings with spaces therebetween, each wing provided with a circular groove, a member having a channeled and milled crown and a crown in relief provided with studs corresponding in number to said wings and engageable in the spaces between the outer end of the wings of the other member, a central cylindrical member having a groove and a spring disposed between said central member and the junction piece, and elastic rings in the groove of said central member.

2. The combination with a central cylindrical member having a circular groove, a cylindrical junction piece having trapezoidal wings with a circular groove in each wing near the outer end and one near the base, a member in the form of a channeled and milled crown and having a crown in relief received in the groove at the base of the wings and provided with studs engageable in the grooves at the outer end of the wings of the opposite member, means securing the crown in relief in the groove, and a spring disposed between the junction piece and central member.

3. The combination with cylindrical central pieces having studs, cylindrical junction pieces at opposite ends thereof and having helical grooves receiving said studs to effect a coupling, the central pieces having at their adjacent ends semi-circular grooves, elastic rings in said grooves, a collar on each junction piece and having an inner circular groove, a metal ring slidable therein, and springs between the central pieces, and junction pieces, and screws for securing the parts in position.

4. In a device of the character described, central cylindrical pieces, cylindrical junction pieces over the outer ends of said central pieces, the central pieces having wings each wing having a groove in the form of a semi-circle, packing rings therein, collars on the junction pieces, sectional metallic rings therein, members having limited rotary motion and provided with studs engageable in the grooves of said wings to effect a coupling, springs between the central and the junction pieces, and screws forming the fastening means for said parts.

In testimony whereof I affix my signature.

CLAUDE REVAILLOT.

In the presence of—
H. C. COXE,
GEORGE RIGOT.